Sept. 14, 1948.                R. L. LONGINI                2,449,493
                ATTAINING HIGH VACUUM IN PHOTOELECTRIC TUBES
                            Filed Aug. 28, 1947
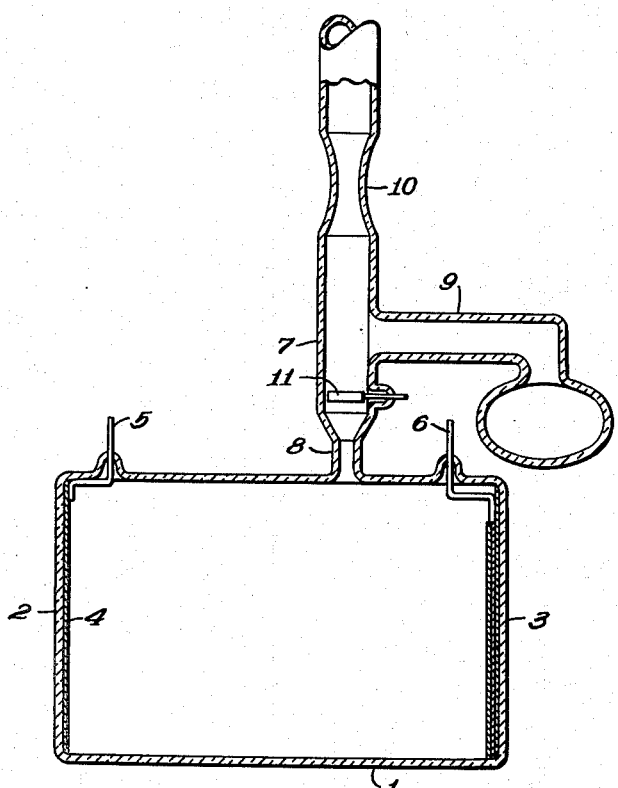
WITNESSES:                                        INVENTOR
Robert C. Baird                            Richard L. Longini.
Mw. C. Groome                              BY
                                              F. W. Lyle.
                                              ATTORNEY Patented Sept. 14, 1948

2,449,493

UNITED STATES PATENT OFFICE 2,449,493

ATTAINING HIGH VACUUM IN PHOTOELECTRIC TUBES

Richard L. Longini, Pittsburgh, Pa., assignor to Westinghouse Electric Corporation, East Pittsburgh, Pa., a corporation of Pennsylvania Application August 28, 1947, Serial No. 771,114

7 Claims. (Cl. 316—20)

My invention relates to a procedure useful in the manufacture of certain types of electronic tubes and, in particular, relates to a procedure for attaining a high vacuum in photoelectric tubes having light-sensitive surfaces utilizing caesium or other highly volatile elements.

In the manufacture of high vacuum tubes, it has for many years been a conventional step to employ what are known as "getters" to attain and maintain high vacuum by scavenging certain gases and vapors which it is difficult to evacuate completely from the containers before sealing them off from the evacuating pumps at the time of their manufacture. The getter is usually employed after the container has been evacuated to quite a high degree, usually with its walls heated considerably above room temperature to speed up the emission of occluded gases and vapors. The getter usually consists of a substance which can be vaporized by heat and which, subsequently condensing on the walls of the container, will chemically combine with, or physically entrap, any above-mentioned remnant gases and vapors in the tube atmosphere which the evacuating pumps have been unable to remove completely.

In connection with certain types of tubes embodying photoelectrically active surfaces, it has been found desirable to first deposit a thin layer of antimony and to subsequently develop the photoelectric activity of the latter by subliming caesium vapor into the container from a side vessel in which the caesium is heated. However, the use of the antimony layer has the disadvantage that it prevents heating the container wall on which it is deposited to a temperature above about 250° C., since antimony sublimes at such higher temperatures. A temperature of 250 degrees is undesirably low as a tube-processing temperature, since the gases and vapors condensed or occluded on the tube walls are emitted relatively slowly, so that a prolonged heating and pumping operation is made necessary to eliminate them to a satisfactory degree. Under such circumstances, it is necessary to rely on getters to eliminate gases and vapors which are emitted from such walls for long periods of time after the tube is sealed off from the pumping system. However, it has been found that, if the getter is vaporized after the tube has been filled with caesium vapor, as above described, in order to activate the antimony surface, there is a reaction between gases evolved when the getter is fired and the caesium which seriously decreases the photoelectric activity of the antimony-caesium surface.

One object of my invention is, accordingly, to provide a procedure by which getters may be effectively employed in tubes employing surfaces which contain caesium or other volatile substances.

Another object of my invention is to provide a method of attaining and maintaining a high vacuum in electron tubes embodying wall surfaces which contain caesium or other chemically-active substances likely to react with getter materials at elevated temperatures.

Still another object of my invention is to provide a procedure for manufacturing evacuated containers having wall portions comprising caesiated antimony.

A further object of my invention is to provide a means of using a getter in a caesium-antimony type photocell containing an X-ray or an electron phosphor where very high vacuum is needed and where the tube cannot be heated to a high temperature with the caesium present as the caesium will then penetrate the protecting layer over the phosphor and ruin the tube for practical purposes.

Other objects of my invention will become apparent upon reading the following description, taken in connection with the drawing in which the single figure illustrates one type of electron tube in which the procedure in accordance with my invention may be employed while in process of construction.

Referring in detail to the drawing, I illustrate my invention as applied to a high vacuum tube comprising a substantially cylindrical container 1 which may have glass walls, and on which the end wall 2 is coated with a layer 4 of caesiated antimony. Such a container is described in copending application of Lloyd P. Hunter and myself, Serial No. 771,112, filed on August 28, 1947, for an Image Intensifier and assigned to the assignee of the present application. In the above-mentioned copending application, the end wall 3 of the container is coated with a compound layer comprising an electron phosphor, zinc cadmium-sulphide, protected from chemical attack by a coating such as potassium silicate over which is deposited a thin coating of aluminum metal. The external face of the end wall 2 is described in that application as coated with a layer (not shown here) of fluorescent material. This tube is employed to produce on the end wall 3 an intensified visible image of a picture produced by X-rays projected onto the fluorescent layer on the end wall 2. However, it will be readily recognized that the invention which I am here describing is not limited in application to the particular type of photoelectrically sensitive tube described in the above-mentioned copending application, but is widely applicable to tubes containing photoelectric surfaces of the same general type.

In the manufacture of the above-mentioned tube, the interior face of the end wall 2 is coated with a thin layer of antimony, for example, by subliming evaporated antimony thereon before the end wall 2 has been installed in the container 1 and at a time when this sublimation process may be carried out in a separate evacuated container. The antimony layer is made so thin as to be substantially transparent. Since the method of depositing thin layers of antimony by sublimation on glass surfaces is well known in the high vacuum container art, there is no necessity for describing it in detail here.

The end wall 2 with its coating of antimony deposited upon it is then sealed into the remainder of the container 1. A lead wire 5 is sealed at an appropriate place through the wall of the container 1 in order to connect electrical circuits to the antimony layer 4. A similar inleading wire 6 may be sealed through the wall of the container 1 in order to obtain electrical contact to layers deposited on the interior face of the wall 3. A tubulation 7, having a first constricted portion 8 adapted for seal-off purposes in a suitable position relative to the wall of the container 1, is provided for connecting the container 1 to a vacuum pumping system (not shown) during the course of manufacture of the vacuum tube 1. A side tube 9 containing a caesium compound such as caesium dichromate mixed with silicon contained within a nickel capsule is attached to the tubulation 7. After the container 1 has been well evacuated, the walls of container 1 and side tube 9 are heated and the nickel capsule is heated by high frequency induction thereby evolving caesium vapor. The tubulation 7 is also provided with a second constriction 10 by which the entire structure including side tube 9 may be sealed off from the vacuum pump.

In accordance with my invention, I provide for using a getter during the evacuation of the container 1 by mounting a container 11 having nickel walls enclosing barium or other suitable getter within the confines of the portion of the above-described system below constriction 10. The container 11 may, for example, be mounted by attachment to a lead-in and is so positioned as to be closely adjacent the constriction 8 in the tubulation 7. The container 11 has a portion of its wall immediately in front of the constriction 8 made relatively thin, so that when it is heated up by high frequency induction or the like, the enclosed barium will develop sufficient vapor pressure to break through the thin portion of the wall of the container 11 and will be projected onto the walls of the constriction 8 and the immediately adjacent portions of the wall of container 1.

The procedure for evacuating the container 1 is then as follows: The pumping system is first used to reduce the pressure within the container 1 to a relatively high vacuum, the container wall being heated by enclosing in a suitable oven or by other methods conventional in the high vacuum tube art, to a temperature not far below 250° C. After continuing this heating for a sufficient time to largely free the walls of container 1 from occluded gases and vapors, caesium vapor is generated in side tube 9 as above described. The getter container is then heated just below the point at which it emits the getter vapor to outgas said container. The constriction 10 is then heated sealing off the system from the vacuum pump. Container 11 is then heated by any of the methods conventional in the art to expel the vapor of the barium contained therein, which vapor diffuses through the interior of the container 1, reacting with or carrying down the remnants of gas and vapor which have not yet been evacuated by the pumping system, and a considerable portion of this getter depositing on the walls of the container 1 adjacent the point of attachment of tubulation 7, and, in particular, thoroughly coating the interior walls of the constriction 8.

The side tube 9 containing caesium is then heated to evaporate the latter and cause its vapor to fill the container 1 and to react with the antimony layer 4 probably to form a caesium-antimony compound probably $Cs_3Sb$. While the resulting surface on the end wall 2 is highly active photoelectrically, it has been found that by recycling the caesiating process this activity may be improved. The side tube 9 is therefore allowed to cool and the container wall 2 heated probably changing the caesium-antimony compound to $Cs_3Sb$ and recondensing a part of the caesium vapor in the side tube 9. The wall portion 2 is then allowed to cool and the side tube 9 again heated to drive caesium vapor again into the interior container 1 in quantity, and this cycling process may be repeated several times.

Thereafter the tubulation 7 is sealed off from the container 1 by heating the constricted portion 8 in a manner well known in the vacuum tube art. This heating evolves certain gases from the molten glass at the time the seal-off is being made, but since these gases are in immediate contact with a layer of the getter-material, they are at once absorbed and prevented from deteriorating the vacuum inside the container 1. The heating of the glass evaporates the coating of the getter on the portion which actually melts to form the seal, so that no difficulty has been found from imperfection of the seal due to the continued presence of the getter. The portions of the getter on the parts of the wall of container 1 near the seal are, however, not all evaporated and they absorb any gas evolved by the molten glass which has escaped the atmosphere of getter-vapor in the immediate vicinity of the seal itself. It has been found that by the foregoing procedure the presence of injurious gases and vapors inside the container 1 is prevented, and the desired purity of the caesium atmosphere therein maintain during a long tube life.

While I have illustrated the foregoing process by description of its application to a photoelectric tube, it is evidently equally applicable to evacuation of other types of container in which gases or surfaces subject to attack by the getter-vapor are to be incorporated.

I claim as my invention:

1. The method of evacuating a container having a wall portion comprising a caesium-antimony compound which consists in first evacuating the atmosphere through an exit from said container, second evaporating a getter in such a position within said container that it condenses on the walls thereof immediately adjacent said exit, third causing caesium vapor to flow into said container and thereafter sealing off said container at said exit.

2. The method of evacuating a container having a wall portion comprising a caesium-antimony compound which consists in first evacuating the atmosphere through an exit from said container while said container is maintained at a temperature of not over 250° C., second evaporating a getter in such a position within said container that it condenses on the walls thereof immediately adjacent said exit, third causing caesium vapor to flow into said container and thereafter sealing off the wall of said container at said exit.

3. The method of evacuating a container having a wall portion comprising a caesium-antimony compound which consists in first evacuating the atmosphere through an exit from said container while said container is maintained at a temperature of not over 250° C., second evaporating a getter in such a position within said container that it condenses on the walls thereof immediately adjacent said exit, third causing caesium vapor to flow into said container and thereafter sealing off the wall of said container at said exit thereby vaporizing the getter and rendering it active by the sealing off operation.

4. The method of evacuating a container having a wall portion comprising a caesium-antimony compound which consists in first evacuating the atmosphere through an exit from said container, second evaporating a getter in such a position within said container that it condenses on the walls thereof immediately adjacent said exit, third causing caesium vapor to flow into said container, fourth driving a substantial portion of said caesium vapor out of said container, fifth again causing caesium vapor to flow with said container, and thereafter sealing off the wall of said container at said exit.

5. The method of evacuating a container having a wall portion comprising a caesium-antimony compound which consists in first evacuating the atmosphere through an exit from said container, second evaporating a getter in such a position within said container that it condenses on the walls thereof immediately adjacent said exit, third causing caesium vapor to flow into said container, fourth driving a substantial portion of said caesium vapor out of said container and repeating said inflow and outflow of caesium vapor, and thereafter sealing off the wall of said container at said exit.

6. The method of evacuating a container having a wall portion comprising a caesium-antimony compound which consists in first evacuating the atmosphere through an exit from said container while said container is maintained at a temperature of not over 250° C., second evaporating a getter in such a position within said container that it condenses on the walls thereof immediately adjacent said exit, third causing caesium vapor to flow into said container, fourth driving a substantial portion of said caesium vapor out of said container and repeating said inflow and outflow of caesium vapor, and thereafter sealing off the wall of said container at said exit.

7. The method of evacuating a container having a wall portion comprising a caesium-antimony compound which consists in first evacuating the atmosphere through an exit from said container while said container is maintained at a temperature of not over 250° C., second evaporating a getter in such a position within said container that it condenses on the walls thereof immediately adjacent said exit, third causing caesium vapor to flow into said container, fourth driving a substantial portion of said caesium vapor out of said container and repeating said inflow and outflow of caesium vapor, and thereafter sealing off the wall of said container at said exit thereby vaporizing the getter and rendering it active by the sealing off operation.

RICHARD L. LONGINI.